May 16, 1950  L. H. MIDDLETON ET AL  2,507,801
DIFFERENTIAL ELECTRICAL METER
Filed Oct. 9, 1944  2 Sheets-Sheet 2

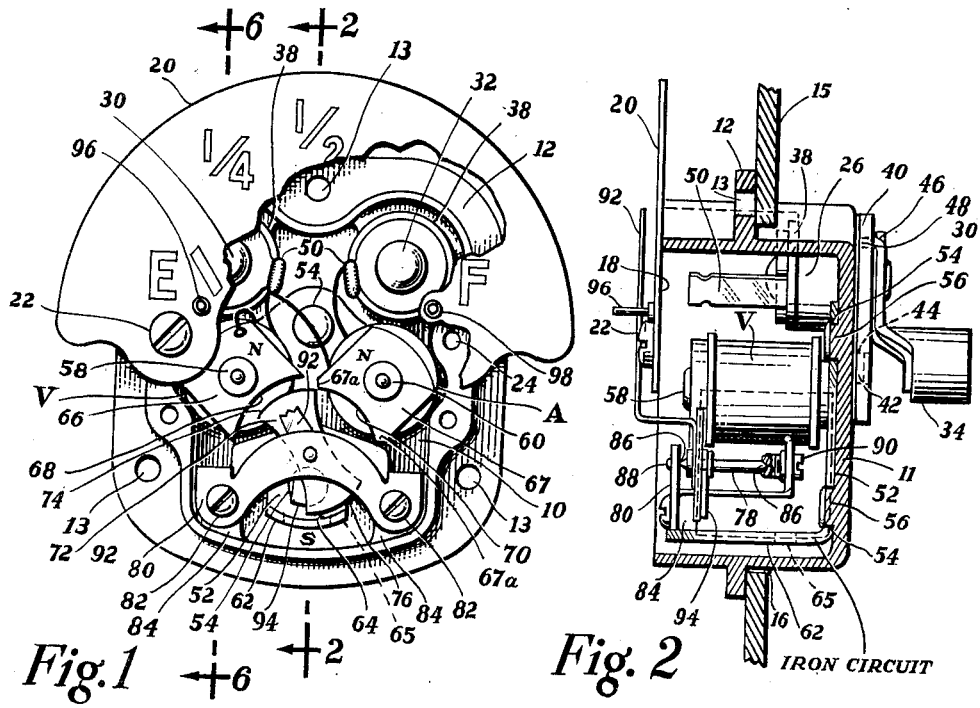

INVENTORS
Leslie H. Middleton &
Edward A. Kern
BY Falvey, Souther & Stoltenberg
ATTORNEYS Patented May 16, 1950

2,507,801

UNITED STATES PATENT OFFICE 2,507,801

DIFFERENTIAL ELECTRICAL METER

Leslie H. Middleton, Toledo, and Edward A. Kern, Weston, Ohio

Application October 9, 1944, Serial No. 557,747

6 Claims. (Cl. 171—95)

This invention relates to gauges, more particularly to electromagnetic gauges used in connection with automobiles.

In the prior art with gauges of the type disclosed herein, the torque acting on the armature to deflect an indicating device, usually a pointer cooperating with a scale, was inordinately weak so that the pointer of the indicating device readily reacted to extraneous influences, such as vibration and the like. The present invention contemplates a gauge structure which is designed to substantially improve the torque characteristics so that more torque is available to create a deflecting force for the indicating pointer and also to hold the indicating pointer at its true location where it bears an accurate relation to the condition of the physical effect being measured. To accomplish this end, the magnetic circuit of the gauge has been improved and smaller air gaps are utilized therein to create relatively high flux for the ampere turns used in the electromagnetic coils.

This invention further contemplates the provision of an indicating unit for use on the dashboard of an automobile which is uniformly adaptable to the various indicating circuits of the automobile, such as the fuel level in a storage tank, oil pressure and temperature of the motor, etc., which will allow institution of mass production methods in the fabrication of all the indicating units in one line, resulting in lower production costs and a more uniform product. There are also advantages inherent in this procedure from the merchandising point of view.

It is, therefore, a principal object of this invention to provide an electromagnetic gauge which has improved torque characteristics.

It is a further object of this invention to provide a gauge unit for indicating purposes which has a high torque characteristic and one which is suitable for use in several of the indicating circuits on an automobile.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is an elevational view, partly in section, from the forward side.

Fig. 2 is a sectional elevation, taken along the line 2—2 of Fig. 1.

Fig. 3 is a rear elevational view.

Fig. 6 is a sectional elevation, showing details of a binding post.

Figure 4:
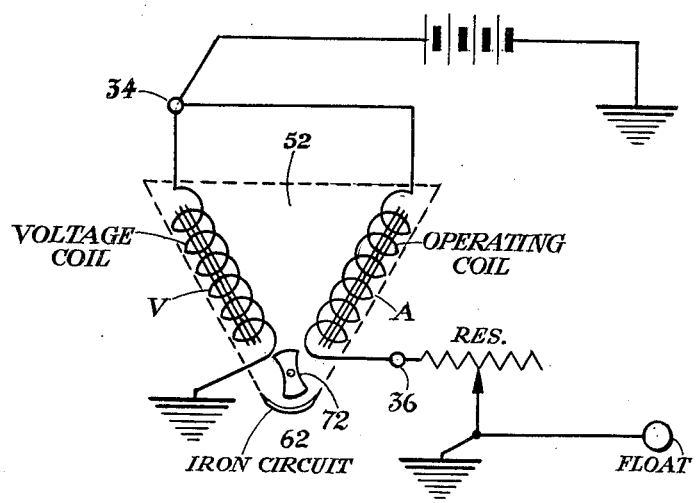
Fig. 4 is a schematic diagram of connections of one application of the gauge.
Figure 5:
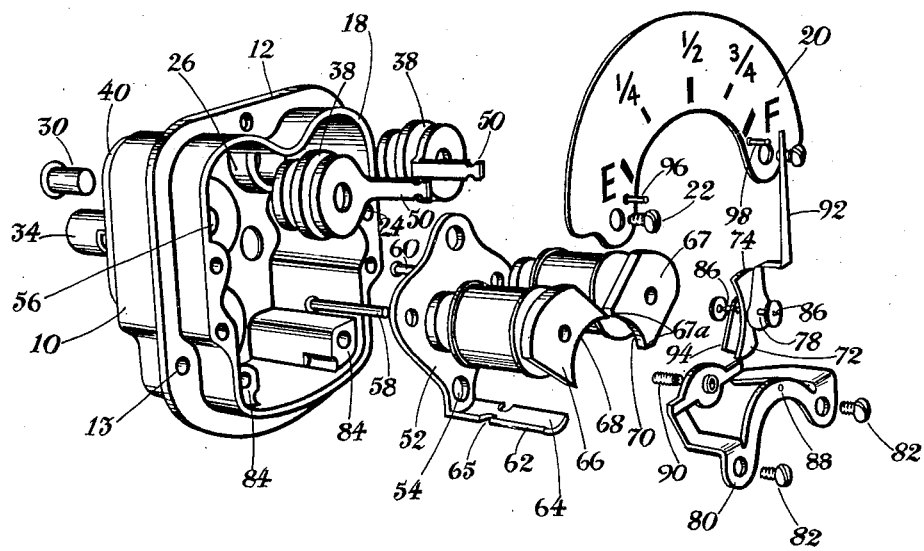
Fig. 5 is an exploded perspective view of the parts.

Referring to the drawings, particularly to Fig. 1, a cup-like casing 10, preferably of die cast metal, is provided having a base 11 and an outwardly extending flange 12 which is provided with apertures 13 through which attaching screws (not shown) may pass to fix the gauge in a panel 15 or the like, having a suitable aperture 16. The flange 12 may cooperate with the forward or rearward side of the panel 15 as is most convenient. On the lip 18 of the casing 10 a dial 20 is provided, being attached thereto by screws 22 positioned in aligned apertures 24 in the dial and the lip.

The base member 11 of the casing is provided with a pair of internal bosses 26 (Fig. 6) provided with apertures 28 in which are positioned a pair of rivets 30 and 32 which attach a pair of binding posts 34 and 36 to the back side of the casing. The binding posts and rivets are insulated from the metallic casing by fiber washers 38 and a fiber mounting plate 40 as is well known in the art. An exterior boss 42 may be provided on the base member to cooperate with an aperture 44 in the fiber plate 40, and depending lugs 46 may also be provided on the binding posts to cooperate with aperture 48 in the plate to prevent turning thereof after being riveted in position. The binding posts 34 and 36 may be of any suitable type, preferably one which cooperates with a stud (not shown) on the end of a conductor. On the interior of the casing connecting lugs 50 are provided to cooperate with rivets 30 and 32 to allow convenient soldering of the internal connection of the gauge as will be described hereinafter.

The magnetic circuit of the gauge is fabricated as a sub-assembly separate from the casing and thereafter positioned in the casing. It comprises a base portion 52 of suitable magnetic material provided with spaced apertures 54 into which fit internal integral bosses 56 on the base of the casing which are riveted into the apertures to fix the assembly into the interior of the casing. The base portion 52 is provided with a pair of studs 58 and 60 which are preferably riveted in apertures in the base portion, and also with an integral lug 62 conformed with an arcuate surface 64 symmetrically positioned with reference to the studs 58 and 60 as will be described hereinafter. The lug 62, adjacent the base portion, is provided with an attenuated section 65 which will facilitate manual adjustment of the air gap for compensation. Coils V and A are prewound and positioned on studs 58 and 60 respectively, and are held thereon by means of magnetic end plates 66 and 67 riveted to the upper end of the studs. The end plates are relatively thick and are provided with arcuate surfaces 68 and 70 which lie approximately within the locus of a circle embracing also the arcuate surface 64 of the lug 62. Preferably end plate 67 is made slightly longer than end plate 66 so that arcuate surface 70 will be located closer to the lug 62 which tends to decrease the air gap for the flux created by actuating coil A for reason given hereinafter.

An armature 72 of magnetic material is provided to cooperate with arcuate surfaces 64, 68 and 70 in the plane of the end plates 66 and 67, and is given convex surfaces 74 and 76 which may lie in the locus of a circle having its center in a supporting spindle 78, which is journalled in a bracket 80 of non-magnetic material attached to the base 11 by means of screws 82 which are threaded into internal bosses 84. The spindle 78 may preferably be formed with pointed ends 86, one end of which fits into an indent 88 in the forward end of the bracket and the other end into an adjustable journal screw 90 threaded into the inner portion of the bracket, as shown in Fig. 2. An indicating pointer 92 may be attached to the spindle to be rotated by the armature 72 before the dial 20 which is attached to the casing as described above. To return the armature and pointer to a zero or empty position, a non-magnetic weight 94 is also attached to the spindle which upon termination of the magnetic fields of the coils V and A wll return the pointer so as to rest against a stop pin 96. A second stop pin 98 is provided on the "Full" end of the scale to prevent the pointer from swinging off the scale.

The coils V and A are connected in an electric circuit as shown in Fig. 4, with the coil V connected in parallel with a battery B which supplies the electrical energy for the circuit, while coil A is first connected in series with variable resistance RES which is varied in accordance with a primary physical condition to be indicated, such as fuel level, temperature, or pressure. The various branches of the circuit are grounded in the manner well known in the art to make complete circuits through battery B which also has one terminal grounded. The coils V and A are connected in such a manner that the end plates 66 and 67 have the same polarity.

The function of the coil V is to compensate for variations of voltage of the battery B by creating a field in the magnetic circuit which acts upon the armature 72 which bears a relation to the voltage of the battery. The function of the operating or actuating coil A is to create a cross field at an angle of ninety degrees from the field created by the coil V, which varies in accordance with the voltage of the battery B and the value of the variable resistance RES controlled by the physical effect being measured. The armature 72 will take a position in the magnetic field created by the coils V and A where the turning moments of the two components balance which will bear a relation to the physical effect or condition which controls variable resistance RES. The air gap between the armature 72 and end plate 66 is somewhat larger than the air gap between the armature and end plate 67 in order to increase the sensitivity of the armature to variations in the field, inasmuch as the field created by coil A will vary between wider limits than the field created by coil V. In order to further increase this effect, the field of coil A is further concentrated by having the tips of the end plate 67 cut away at 67a as shown in Fig. 1.

The action of the armature 72 is controlled for calibration during fabrication by comparative test against a standard and compensation for variables is made by bending the lug 62 about its attenuated portion 65, either by uniformly varying the length of the air gap or by varying the air gap effecting the armature as it is deflected in the field by twisting the lug to give a non-uniform gap.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. In a device of the class described, a cup-like casing, terminals positioned in apertures in the base of the casing in insulated relation therewith, a magnetic member attached on the interior to the base of the casing, having a pair of spaced normally-disposed studs of magnetic material, electro magnetic coils mounted concentrically on said studs, magnetic head members positioned on the ends of the studs to hold the coils in position, said heads being provided with arcuate faces in one plane normal to the studs, a rotatable armature in the plane of said heads having arcuate faces cooperating with the arcuate faces of said heads through an air gap, bracket means for mounting said armature attached to the casing entirely separate of the magnetic member, and an adjustable vertically-disposed lug on said magnetic member cooperating with the armature through an air gap to form a complete magnetic circuit between the coils and the armature whereby the armature is responsive to the magnetic field created by the coils.

2. In a device of the class described, a magnetic member having a base member and an upwardly struck lug to form a magnetic return having an arcuate surface adjacent the locus of a circle, a pair of studs of magnetic material positioned in spaced parallel relation with each other and the lug on said base member, electromagnetic coils concentrically mounted on each of the studs, magnetic head members having arcuate surfaces mounted normally of the studs above the coils, said arcuate surfaces being in one plane adjacent the locus of said circle, a rotatable armature cooperating with the heads and the lug to form a complete magnetic circuit, a cup-shaped casing attached to the magnetic member to protect the assembled magnetic members including the armature, bracket means forming a journal for the rotatable armature supported on the casing entirely separate from the magnetic member, and binding posts mounted in the casing in insulated relation from each other.

3. In a device of the class described, a voltage coil, an actuating coil positioned in parallel relation with the voltage coil, heads of magnetic material cooperating with said coils in a plane normal to the axes thereof having arcuate surfaces lying adjacent the locus of a circle disposed approximately 90° apart, common magnetic means positioned parallel to said heads cooperating with both coils having a vertically-disposed adjustable lug with an arcuate surface lying adjacent the locus of said circle in symmetrical juxtaposition with the heads, an armature of magnetic material having arcuate end surfaces rotatably mounted in the plane of said heads with a fixed air gap between said arcuate end surfaces and the arcuate surfaces on the heads and the arcuate surface of the lug of the common magnetic means, said air gap between the arcuate surfaces of said arcuating coil head and armature being relatively concentrated and substantially smaller than that between the head of the voltage coil and the armature, and slot means cooperating with the lug of the common magnetic means for permitting adjustment of the air gap between said arcuate surface thereon and the armature.

4. In a device of the class described, a voltage coil, an actuating coil positioned in parallel spaced relation with the voltage coil, arcuate heads of magnetic material on said coils and normal to their axes having arcuate surfaces lying adjacent the locus of a circle disposed approximately 90° apart, common magnetic means cooperating with both coils having a vertically-adjustable lug with an arcuate surface lying adjacent the locus of said circle in symmetrical juxtaposition with the arcuate heads, an armature of magnetic material having arcuate end surfaces rotatably mounted in the plane of said arcuate heads with an air gap between said arcuate end surfaces and the arcuate surfaces on the heads and the arcuate surface on the lug of the common magnetic means, said air gap between the arcuate surface of the head of said actuating coil and the end arcuate surface of the armature being relatively concentrated and substantially smaller than that between the arcuate surface of the head of the voltage coil and the arcuate end surface of the armature, and slot means cooperating with the lug of the common magnetic means to allow change of air gap between said arcuate surface thereon and the armature.

5. In a device of the class described, a field circuit of magnetic material adapted to be fabricated as a subassembly including a pair of coils cooperating with arcuate pole pieces and an adjustable arcuate return pole all located exteriorly of the locus of a circle, a bracket assembly journalling an arcuate armature and a pointer, and a supporting means including separated attaching means for holding the two assemblies in cooperative position, whereby the armature is responsive to the magnetic field created in the field circuit by said coils.

6. In a device of the class described, a field member of magnetic material for a field circuit adapted to be fabricated as a sub-assembly including an adjustable return pole and a pair of electromagnetic coils positioned normally thereto having adjustable arcuate pole pieces, all of said poles being located exteriorly of the locus of a circle, a bracket assembly journaling an arcuate magnetic armature and an indicating pointer also adapted to be fabricated as a sub-assembly, and a supporting base means including insulated binding posts for the electrical circuits through said coils for separately and individually mounting the two subassemblies in cooperative position whereby the armature is responsive to the magnetic field created in the field circuit by said coils.

LESLIE H. MIDDLETON.
EDWARD A. KERN.

REFERENCES CITED

The following references are of record in the file of this patent:

UNITED STATES PATENTS

| Number | Name | Date |
|---|---|---|
| 1,713,850 | McCoy | May 21, 1929 |
| 1,745,488 | Huggins | Feb. 4, 1930 |
| 1,757,625 | Greibach | May 6, 1930 |
| 1,791,786 | Bacon | Feb. 10, 1931 |
| 2,040,060 | Middleton | May 5, 1936 |
| 2,181,960 | Bacon | Dec. 5, 1939 |
| 2,197,636 | Faus | Apr. 16, 1940 |
| 2,391,992 | Malone | Jan. 1, 1946 |
| 2,460,686 | Fritzinger | Feb. 1, 1949 |